(12) United States Patent
Earle

(10) Patent No.: US 7,649,356 B2
(45) Date of Patent: Jan. 19, 2010

(54) PULSE INDUCTION METAL DETECTOR HAVING HIGH ENERGY EFFICIENCY AND SENSITIVITY

(75) Inventor: John L. Earle, Sweet Home, OR (US)

(73) Assignee: White's Electronics, Inc., Sweet Home, OR (US)

( * ) Notice: Subject to any disclaimer, the term of this patent is extended or adjusted under 35 U.S.C. 154(b) by 356 days.

(21) Appl. No.: 10/323,966

(22) Filed: Dec. 18, 2002

(65) Prior Publication Data

US 2004/0119475 A1 Jun. 24, 2004

(51) Int. Cl.
*G01V 3/00* (2006.01)
*G01V 3/08* (2006.01)
*G01R 19/00* (2006.01)

(52) U.S. Cl. .................. 324/326; 324/67; 324/345

(58) Field of Classification Search ................ 324/233, 324/225, 326–329, 67, 345
See application file for complete search history.

(56) References Cited

U.S. PATENT DOCUMENTS

| | | | |
|---|---|---|---|
| 3,105,934 A | 10/1963 | Barringer | |
| 3,430,221 A * | 2/1969 | Turner et. al. | 307/125 |
| 3,852,659 A | 12/1974 | Barringer | |
| 3,950,695 A | 4/1976 | Barringer | |
| 4,110,679 A | 8/1978 | Payne | |
| 4,128,803 A | 12/1978 | Payne | |
| 4,249,128 A * | 2/1981 | Karbowski | 324/329 |
| 4,325,027 A | 4/1982 | Dykstra et al. | |
| 4,486,713 A | 12/1984 | Gifford | |
| 4,628,265 A | 12/1986 | Johnson et al. | |
| 4,677,384 A | 6/1987 | Payne | |
| 4,700,139 A | 10/1987 | Podhrasky | |
| 4,709,213 A | 11/1987 | Podhrasky | |
| 4,783,630 A | 11/1988 | Shoemaker | |
| 4,868,504 A | 9/1989 | Johnson | |
| 4,894,618 A | 1/1990 | Candy | |
| 4,942,360 A | 7/1990 | Candy | |
| 4,975,646 A | 12/1990 | Llamas Llamas et al. | |
| 5,039,946 A | 8/1991 | Mamontov et al. | |
| 5,047,718 A | 9/1991 | Aittoniemi et al. | |
| 5,506,506 A | 4/1996 | Candy | |
| 5,537,041 A | 7/1996 | Candy | |
| 5,576,624 A * | 11/1996 | Candy | 324/329 |
| 5,729,143 A * | 3/1998 | Tavernetti et al. | 324/329 |
| 6,172,504 B1* | 1/2001 | Earle | 324/329 |
| 6,586,938 B1* | 7/2003 | Paltoglou | 324/329 |

FOREIGN PATENT DOCUMENTS

| | | |
|---|---|---|
| GB | 1350273 | 4/1974 |
| GB | 2004069 | 3/1979 |

* cited by examiner

*Primary Examiner*—Reena Aurora
(74) *Attorney, Agent, or Firm*—James Creighton Wray; Meera P. Narasimhan

(57) ABSTRACT

A pulse induction metal detector having high efficiency and sensitivity. Within the scope of the invention is a high efficiency hand-held metal detector for detecting a metal object, comprising a coil and a source of current flow in the coil. The source is adapted to produce one or more pulses of current in the coil. Preferably, at least two of the pulses are spaced apart in time at least about 20 microseconds during which current flow in the coil is substantially constant. The metal detector also comprises a detecting circuit for detecting a response to the current pulses, and a sampling circuit for sampling the response at predetermined times at least during the time of one of the pulses.

36 Claims, 9 Drawing Sheets

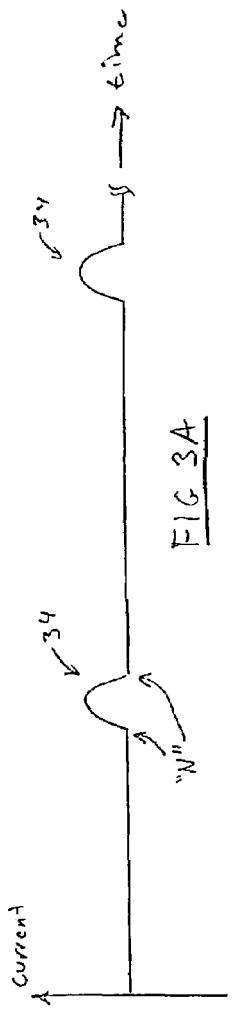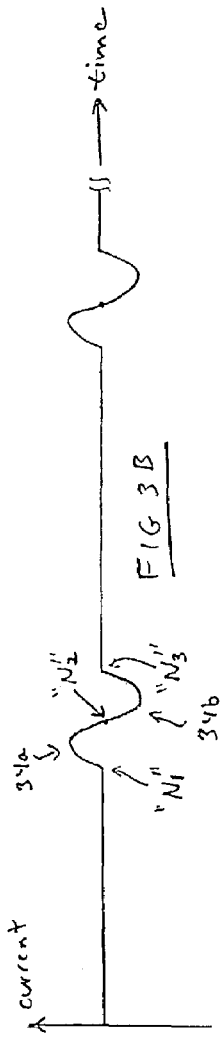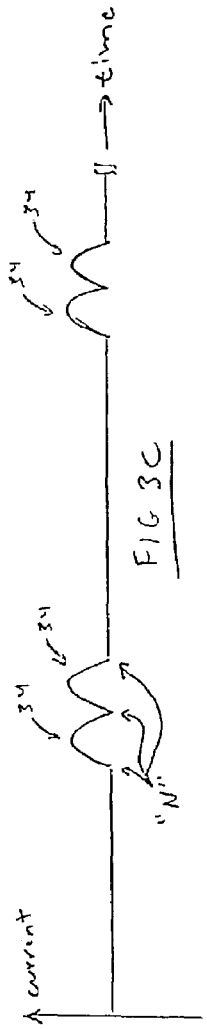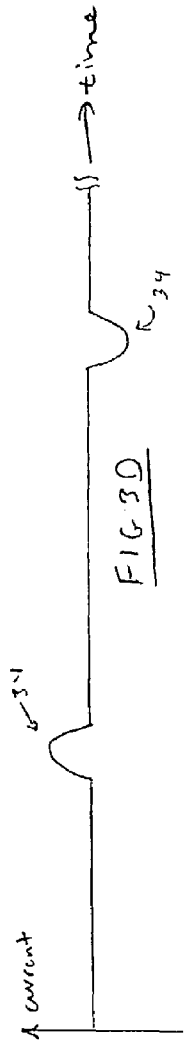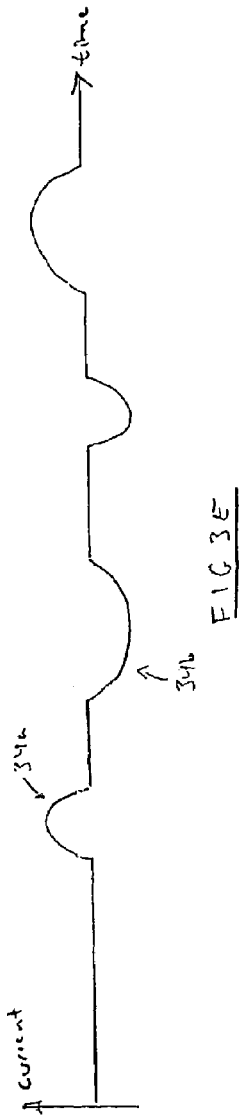

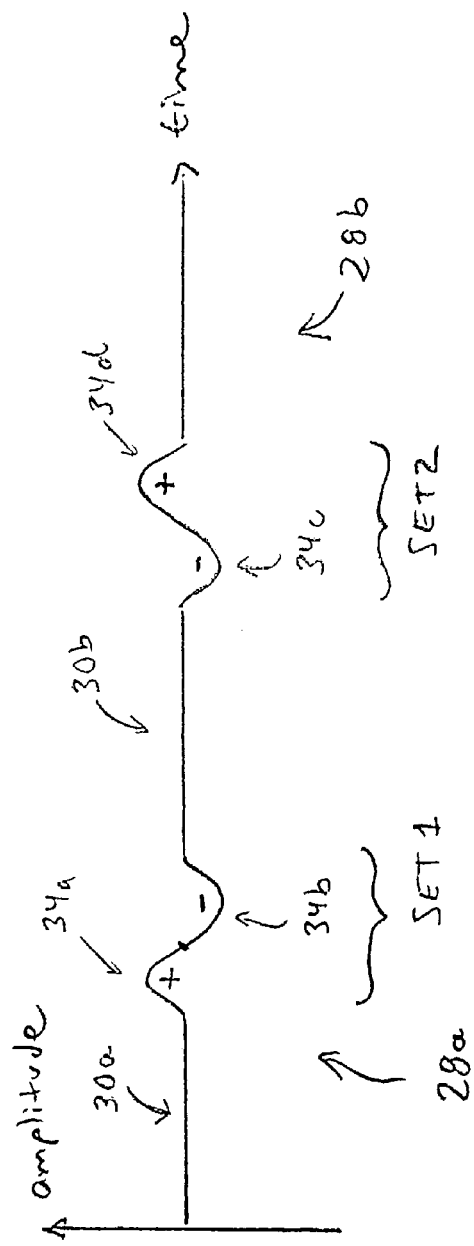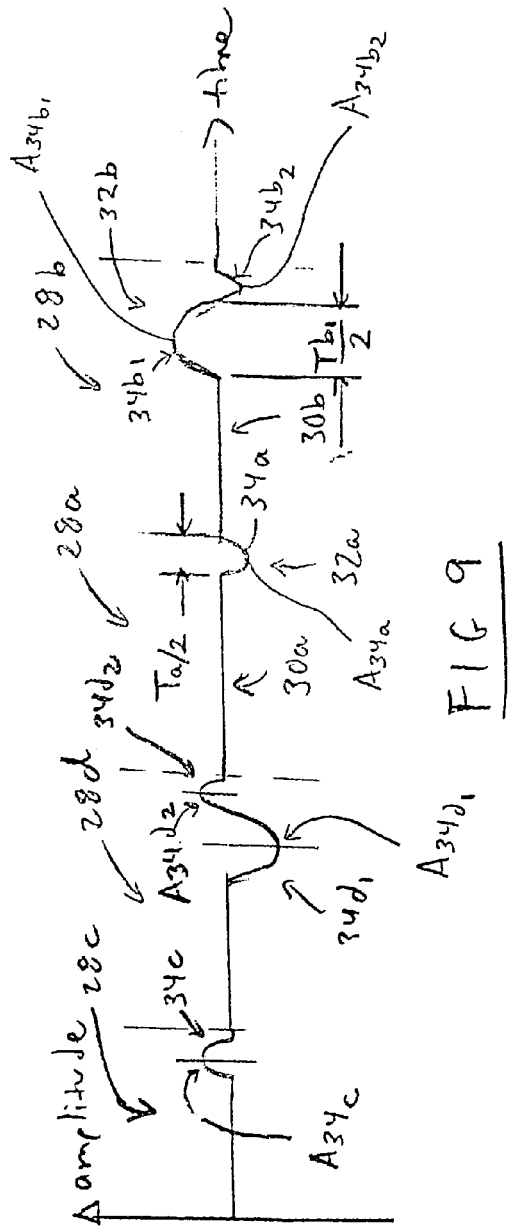

PULSE INDUCTION METAL DETECTOR HAVING HIGH ENERGY EFFICIENCY AND SENSITIVITY

FIELD OF THE INVENTION

The present invention relates generally to a pulse induction metal detector having high energy efficiency and sensitivity, especially a hobbyist type, hand-held, battery powered metal detector having these characteristics.

BACKGROUND OF THE INVENTION

Light-weight, hand-held metal detectors are popularly used by hobbyists and collectors to search for buried or otherwise hidden metal objects of value or particular interest, such as coins, jewelry, and artifacts of historical significance. Such metal detectors typically employ a transmit coil through which current flows, the current establishing time-varying magnetic fields that induce eddy currents in metal objects, and interact with any magnetic permeability of the metal object. These effects are detected in a receive coil, and at least the eddy current effects are indicative of the metal object, permitting its identification.

In addition to metal objects of interest, the ground itself typically contains metallic compounds, particularly compounds containing iron. The iron compounds in particular have a relatively high magnetic permeability that often masks the response of the detector to the metal objects in the ground. It is a problem in the metal detector art to eliminate all the ferrous mineral signals in the target volume of ground while retaining sufficient information to identify the metal objects.

Two classes of hand-held metal detectors have been developed in response to this problem. "Induction balance" detectors produce a continuous periodic interrogating signal. A substantially steady state response due to induced eddy currents in the target is measured during interrogation and is characterized by a magnitude and phase. The effect of ground mineralization is eliminated by adjusting the phase of detection so that it is insensitive to the phase angle of the ground. However, while the magnitude of the response for objects whose phase response is off this angle is thereby detected, the phase response itself is not, so one metal object cannot be distinguished from another.

As a solution to that problem, induction balance metal detectors have used what is known as "motion filtering," which eliminates the effect of ground mineralization by making use of the fact that the ground mineralization is typically distributed over a larger area and is therefore relatively constant in space as compared to the metal objects of interest, such as coins. In motion filtering, the detector is moved over the ground and the rate of change of the response is determined, with the lower frequencies corresponding to the slower changing affects of ground mineralization being filtered out. With the effects of ground mineralization eliminated by motion filtering, the phase angle of the response can be used to discern one metal object from another.

More recently, multiple frequency induction balance has been developed to eliminate the need for motion filtering. In this method, two or more discrete frequencies are used providing two or more ground balanced signals which can be compared to permit discrimination between targets as well as ground nulling. However, metal objects are not equally responsive to the different frequencies, so there is generally a single frequency that is optimum for discerning particular metal objects. Accordingly, a disadvantage of multiple frequency excitation is that the energy that would otherwise be used for the optimum single frequency is divided among several frequencies, with the result that the energy in each frequency is reduced and the depth of detection consequently suffers. This loss of energy efficiency can be a significant problem in battery powered metal detectors.

In induction balance detectors generally, a search head comprises at least two coils, one for transmitting and one for receiving. The coils are overlappingly arranged, or concentrically arranged along with a third, balancing coil, so that the effect of the transmit coil on the receive coil is nulled. Eddy currents induced in the target as a result of the target's response to the transmitted field, results in unbalancing the two coils, producing a response. The characteristic use of phase angles in induction balance detectors leads to this type being alternatively referred to in the art as "frequency domain" detectors.

The other of the two classes of metal detectors is known as "pulse induction," in which a pulse is used to interrogate the target, and the target's response is measured after the interrogating pulse has ceased. To eliminate the major effect of ground mineralization, the method makes use of the fact that the response due to the permeability of the ground mineralization decays almost immediately. However, while the response due to magnetic permeability decays immediately, there is a remaining "magnetic remanence" or "viscous magnetic remanence" effect of the ground that, while not large, may remain in the response for some significant time after excitation. Moreover, the eddy currents induced in the target due to the presence of metal objects also decay after interrogation, and will decay quickly for small targets, so the signals are smaller than the signals obtained in an induction balance detector, making the pulse induction detectors generally less sensitive and less popular.

The use and analysis of a non-periodic time varying response in pulse induction detectors leads to this type also being referred to in the art as "time domain" detectors.

The pulse is critically damped with a damping resistor in order to ensure that the pulse stops as suddenly as possible without ringing, so that remaining eddy currents can be detected as soon as possible before they decay to such low levels that they are no longer useful. However, the damping resistor dissipates a significant amount of the energy used for interrogation. This energy loss is also particularly significant in a hand-held, battery-powered metal detector.

Barringer, U.S. Pat. No. 3,105,934 proposes an airborne electromagnetic system for the remote detection of ore bodies utilizing pulses of short duration to induce transient polarization in the ore bodies. From a loop transmitter in an airplane normally flying at a survey flying height of 500 feet, 80 half-sine current pulses per second are produced and are asserted to thereby radiate a primary, pulsed electromagnetic field. A "bird" having three receiving coils is towed by the airplane, the receiving coils being responsive respectively to three components of secondary fields resolved with respect to the direction of flight. It is proposed that an ore body consisting of base metal values occurring in a massive sulphide deposit may be considered as a conductive sheet in which circulating current will be induced in the presence of the primary field, and that the time constant for decay of this current, when the primary field is absent or not time varying, is indicative of the conductivity of the sheet, which aids in the recognition of varied ore deposits.

Excepting the use of half-sine pulses, for which no reason is given, the system employs the standard pulse induction methodology with its attendant drawbacks. Moreover, the system is not amenable to hand-held use or battery power.

Accordingly, there is a need for a pulse induction metal detector having high energy efficiency and sensitivity, particularly where the capability of the metal detector to reject ground mineralization and to discern and distinguish different metal objects in a target is not sacrificed.

SUMMARY OF THE INVENTION

A method for characterizing a first target volume of ground is disclosed that comprises coupling to the first target volume of ground a first half-sine pulse of current, detecting a first response of the first target volume of ground to the first pulse, and sampling the first response at least once during the first pulse, for characterizing the first target volume of ground.

Preferably according to the method, the sampling includes sampling the first response at three distinct times relative to the first pulse, namely (a) during the rising portion, (b) substantially at the peak, and (c) during the falling portion thereof.

More specifically, the method is preferably performed where the first target volume of around is substantially free of metal objects, and the sampling includes sampling the response at first and second distinct times relative to the first pulse on respective sides thereof to produce respective first and second calibration data points, and determining a transformation function for transforming the first and second calibration data points so as to produce a null result, and includes turning to a second target volume of ground containing one or more unknown metal objects, where the method further includes coupling to the second target volume of ground a second pulse, detecting a second response of said second target volume of ground to the second pulse, sampling the second response at two distinct times that, relative to said second pulse, correspond substantially identically to said first and second times in relation to said first pulse to produce respective first and second target data points corresponding to the first and second calibration data points, and sampling the second response substantially at the peak of the second pulse to produce a first ground balanced target data point, applying the transformation function to the first and second target data points so as to produce a second ground balanced target data point, and characterizing the one or more unknown metal objects using the first and second ground balanced target data points.

An apparatus is also disclosed that is adapted to perform the method.

Therefore, it is an object of the present invention to provide a novel and improved pulse induction metal detector having high energy efficiency and sensitivity.

It is another object of the present invention to provide such a metal detector that provides for improved operating efficiency and economy without sacrificing the capability of the metal detector to reject ground mineralization.

It is still another object of the present invention to provide such a metal detector that provides for improved operating efficiency and economy without sacrificing the capability of the detector to discern and distinguish different metal objects in a target.

The foregoing and other objects, features and advantages of the present invention will be more readily understood upon consideration of the following detailed description of the invention, taken in conjunction with the following drawings.

BRIEF DESCRIPTION OF THE DRAWINGS

FIG. 3A is a plot of the current versus time for an exemplary waveform portion of the electrical signal of FIG. 2 according to the present invention.

FIG. 3B is a plot of the current versus time for an alternative example of a waveform portion of the electrical signal of FIG. 2 according to the present invention.

FIG. 3C is a plot of the current versus time for another alternative example of a waveform portion of the electrical signal of FIG. 2 according to the present invention.

FIG. 3D is a plot of the current versus time for yet another alternative example of a waveform portion of the electrical signal of FIG. 2 according to the present invention.

FIG. 3E is a plot of the current versus time for still another alternative example of a waveform portion of the electrical signal of FIG. 2 according to the present invention.

FIG. 8 is a plot of the amplitude versus time of a pair of waveforms exhibiting alternate polarity sets according to the present invention.

FIG. 9 is a plot of the amplitude versus time for a sequence of four waveforms according to the present invention.

DETAILED DESCRIPTION OF A PREFERRED EMBODIMENT

Figure 1:
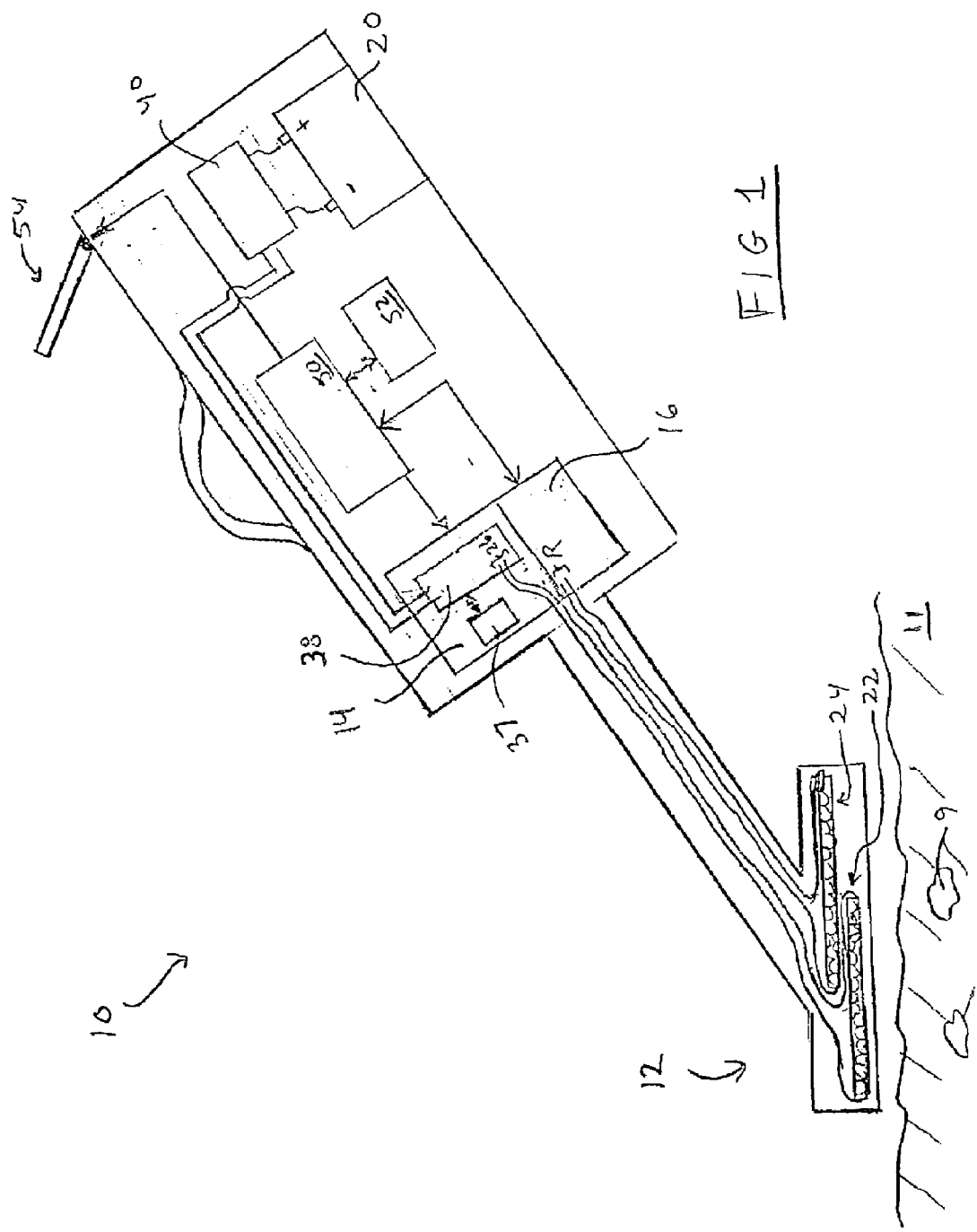
FIG. 1 is a pictorial/schematic view of a metal detector according to the present invention.

Referring to FIG. 1, a metal detector 10 according to the present invention is shown. In the preferred embodiment of the invention, the metal detector 10 is particularly adapted for hand-held use, such as by hobbyists. The detector is used to search for metal objects 9 in a target volume 11 that is typically ground but may be any volume. Since the detector is typically used outdoors to search for metal objects away from independent sources of power, the detector also incorporates a battery 20 to power the detector. While the detector 10 may be used with any power source without departing from the principles of the invention, it provides high energy efficiency which is particularly desirable in a battery powered device.

The metal detector 10 includes a search head 12, a signal generator 14, and a sampling circuit 16. The search head is maintained in close proximity to the ground 11. The signal generator 14 generates interrogating signals for producing eddy currents in the metal objects 9. The interrogating signals typically have a frequency on the order of 10 kHz. The interrogating signals are transmitted to the metal objects through the search head 12, particularly, a transmit coil 22 therein. Eddy currents are produced in the target in response to the interrogating signals.

The transmit coil has a plurality of windings of wire and is typically circular in form. For a hand-held detector 10, the diameter of the transmit coil may be between about 3" and 15", with about 10" being typical. The depth of detection typically ranges between about the diameter of the transmit coil to about 3'. This is because the transmit coil depends on induction to produce the eddy currents in the metal objects, and is too small to radiate significantly as an antenna at the interrogation frequency.

The eddy currents induce a response "R" in the search head 12, particularly a receive coil 24 therein. The receive coil 24 is coupled to the sampling circuit 16 which samples the response R. While the transmit and receive coil can be the same coil, it is preferable to employ at least the two separate coils 22 and 24 in a standard induction balance configuration. As a common alternative, a third coil may be used to null the effect of the transmit coil 22, wherein the coils 22 and 24 and the third coil are all concentric.

The response R has a magnitude and phase that are in general altered from the magnitude and phase of the original signal as a result of the (complex) impedance of the target. The impedance of the target has a real part that produces a (vector) component of the response that is in-phase with the interrogating frequency, and a so-called imaginary part that produces another component of the response that is in-quadrature, or 90 degrees out of phase with the interrogation frequency.

The real, or "Y" component of a given frequency specific response vector represents the effect of the conductivity of all of the material contributing to the response at the specific frequency, while the imaginary, or "X" component represents the effect at the frequency of the reactance of this material. For non-ferrous metal materials and salt-water, the resistive component of the response will be much greater than the reactive component; conversely, for ferrous metals and soil containing iron, the reactive component is larger than the resistive component. Typically, two synchronous detectors aligned to two different phases in quadrature are used to resolve the total frequency specific response into its Y and X components, or "channels," each providing information about the target volume of ground. Particularly, the ratio of the X and Y component amplitudes of the two channels provides the phase shift of the response with respect to the transmitted or interrogating signal that is caused by the target.

In addition to the requirement to distinguish the response from ground, it is necessary to be able to distinguish one metal object from another, i.e., to distinguish one phase shift from another. Accomplishing both of these objectives generally requires two independent methods for detecting responses that are insensitive to ground.

In one conventional method for this purpose, termed "motion discrimination," the user is required to keep the transmit coil in motion. The ground is not necessarily homogeneous, but both the permeability and the conductivity of the ground are relatively constant over a limited area, so that detected signals resulting from ground are relatively slowly varying compared to signals resulting from the much more localized metal objects; the metal objects cause changes in the detected signals that are perceived by the metal detector to have a relatively high frequency. Then, high or band-pass filtering may be used to filter out the low frequency portion of the detected signals corresponding to the ground.

In the other conventional method for detecting responses that are insensitive to ground, often referred to as ground balancing, a location on the ground is selected for calibrating the detector, and it is determined how to linearly combine the X and Y components of the response so that it is zero, or put another way, it is determined how much to rotate the X and Y coordinate system to align it with the phase angle of the ground so that, at the phase angle of the ground, the response is nulled. In practice, this can be achieved by varying the phase angles of respective synchronous demodulators so that the demodulators are insensitive to components with a phase equal to the phase angle of the ground.

The two methods may be combined to permit measuring of the phase angle of the response independent of the effects of ground. Preferably, the metal detector 10 provides two channels of data for which the effect of the ground is removed or nulled in accord with the principles illustrated below, and which may also be rendered to be additionally insensitive to ground according to either or both of the aforementioned conventional methods.

Figure 2:
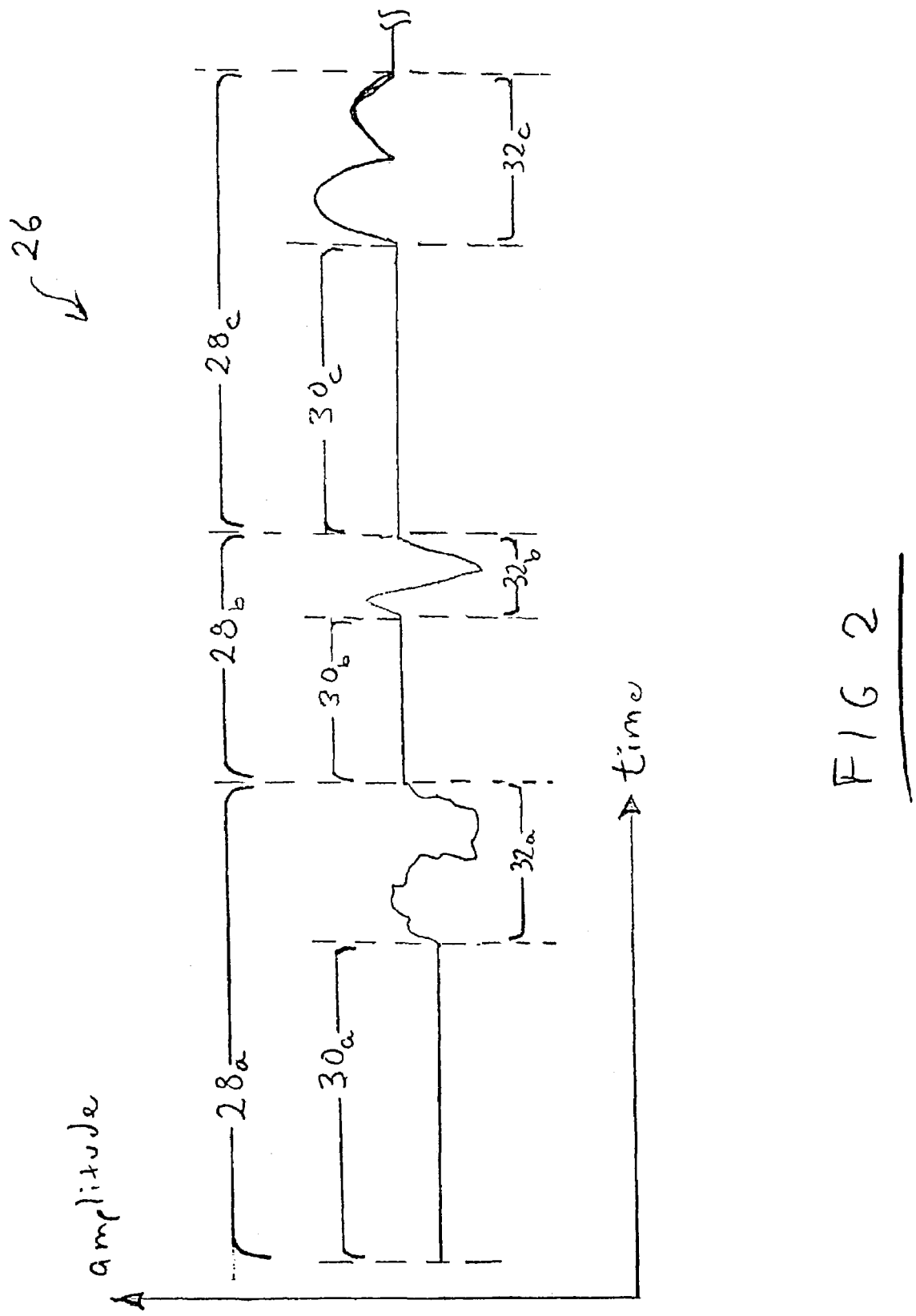
FIG. 2 is a plot of the amplitude versus time of an electrical signal according to the present invention used as an interrogating signal in the metal detector of FIG. 1.

Turning to FIG. 2, the signal generator 14 produces an electrical signal 26 which is characterized by one or more "waveforms" 28 in time sequence, shown as 28a, 28b and 28c. Each waveform 28 is in turn characterized by an associated "settling period" 30, during which the amplitude of the waveform is constant, followed by an "interrogating period" 32, during which the amplitude of the waveform changes continuously in a time-varying manner, such as is shown. The settling period 30 is selected to be at least a minimum time during which the response of the target to any previous excitations has or would have decayed a desired amount.

Preferably, the electrical signal 26 describes current flow through the transmit coil 22, the amplitude of each waveform 28 is substantially zero during the settling period, and the amplitude of the waveform during the interrogating period varies so that there is a wide range of rate of change of current flow during the excitation and a large number of harmonics. More particularly, during the respective interrogating period each waveform 28 preferably comprises one or more pulses 34, each pulse representing a variation in amplitude of the waveform defined by a half-sine wave ("half-sine"), examples of which are given in FIGS. 3A-3E. While half-sine pulses are rich in harmonics and provide a wide and continuous range of rate of change of current, other waveforms or pulses may be employed without departing from the principles of the invention.

A generalized current pulse according to the invention is defined as commencing from a first baseline value of the current, then changing in a time-varying manner until reaching a peak value (that can be either positive or negative) at which the rate of change of the current is zero, and then changing in a time-varying manner to a second baseline value of the current, where the absolute magnitude of the peak value is greater than that of either of the baseline values of the current. The first and second baseline values of the current can be established in respective quiescent periods during which the current is substantially constant at first and second quiescent values, respectively. Alternatively, the first and second baseline values can be established by, respectively, the termination or commencement of another pulse. Preferably, the two baseline values of the current are the same, but this is not necessary, and more preferably, the two baseline values of the current are zero.

Preferably, the current changes so that the time-varying rate is either always positive or always negative prior to reaching the peak value, and thereafter changes so that the time-varying rate is either always negative or always positive, respectively. More preferably, the current changes at the rate of a half-sine or a substantial approximation thereof which commences and terminates at a nodal point of phase.

For purposes of description herein, the single sinusoidal period of current flow through the transmit coil 22 of FIG. 3B is defined as comprising two half-sine pulses 34a and 34b. The pulse 34a originates at the 0 degree nodal point of phase "$N_1$" and terminates at the 180 degree nodal point of phase "$N_2$", while the pulse 34b originates at the 180 degree nodal point of phase "$N_2$" and ends at the 360 degree nodal point of phase "$N_3$" of a sinusoid. An equally useful alternative characterization is that both pulses 34a and 34b originate and end at the same nodal points of phase of a sinusoid, where pulse 34a has positive polarity and pulse 34b has negative polarity. The pulses 34a and 34b are substantially continuously connected in time, i.e., the end of the pulse 34a occurs at substantially the same time as the start of the pulse 34b at the point "$N_2$."

Figure 4:
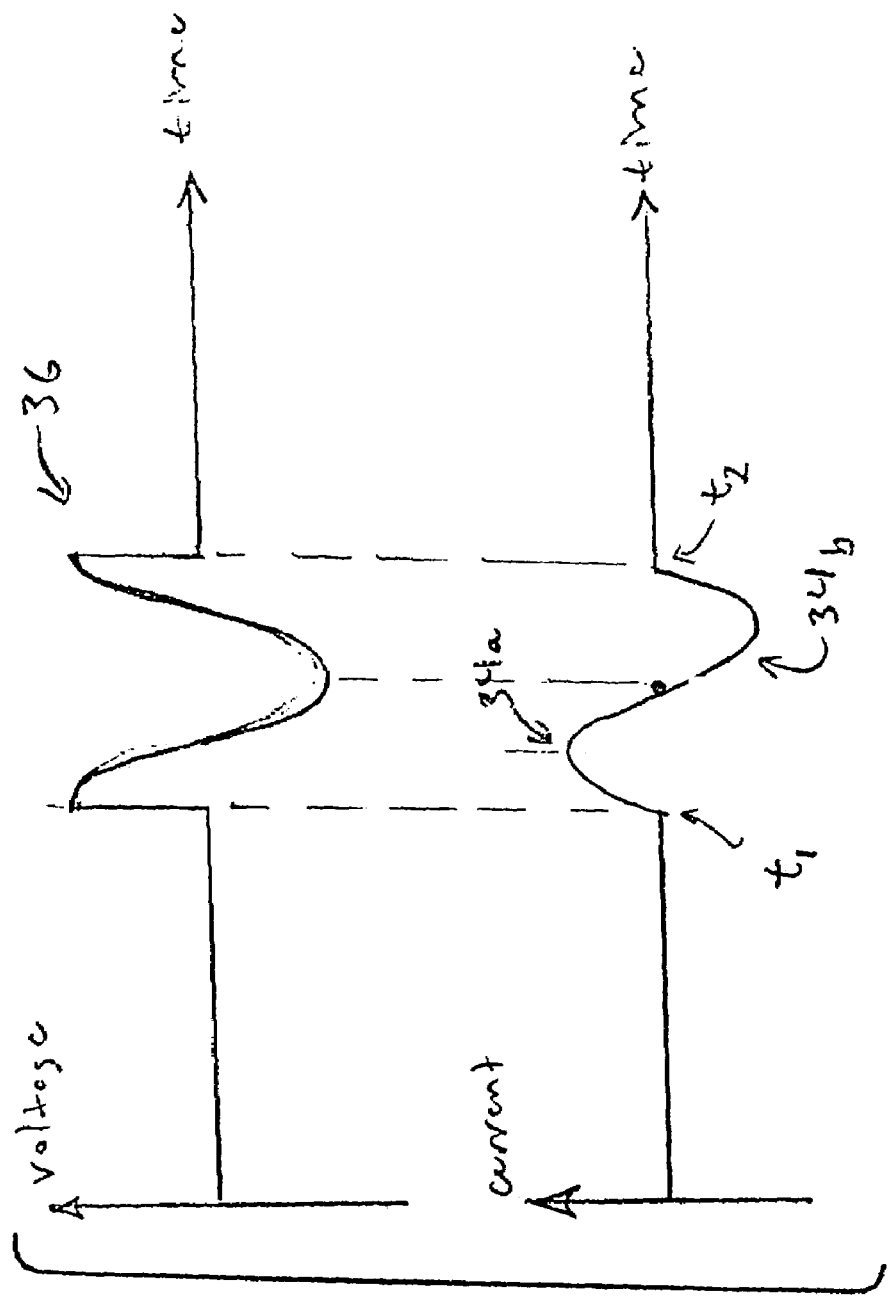
FIG. 4 is a plot of the magnitude of the voltage versus time for producing the current of FIG. 3B.
Figure 5:
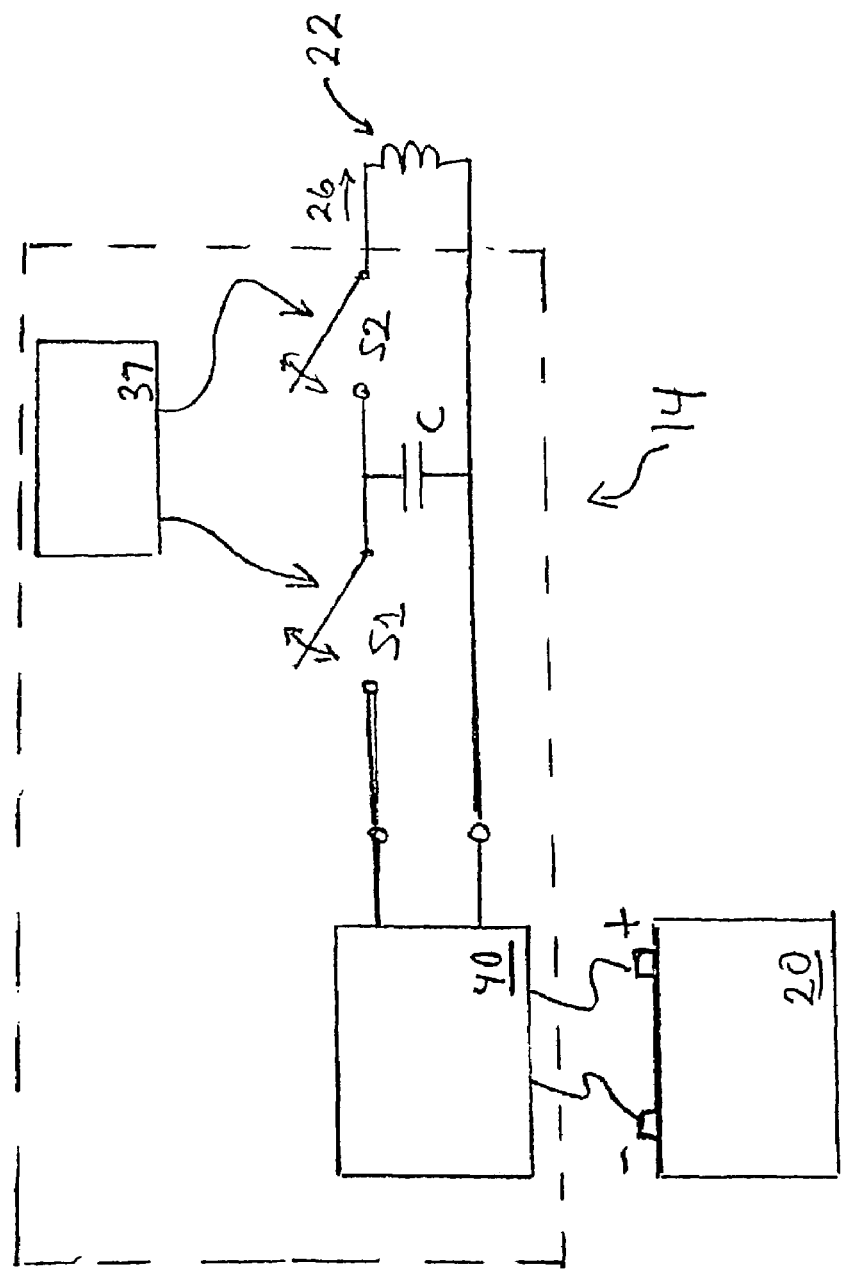
FIG. 5 is a schematic of a signal generator according to the present invention, for producing current waveforms according to FIGS. 3A-3E.

Turning to FIG. 4, to produce the two half-sine pulses 34a and 34b shown in FIG. 3B, the signal generator 14 produces the sinusoidal transmit voltage 36 as shown. From this example, it will be readily appreciated by persons of ordinary skill how to obtain any of the half-sine pulses 34 shown in FIGS. 3A-3E.

To produce the voltage 36, the signal generator 14 includes a controller 37 and a transmit voltage output circuit 38. The output circuit 38 produces the electronic signal 26, here particularly the voltage shown in FIG. 4 to produce two half-sine pulses 34 having the current shown in FIG. 4. A power supply 40 deriving power from, e.g., the battery 20, powers the output circuit 38. Sometime during the settling period for a waveform, the controller 37 closes an electronic switch S1 between the power supply 40 and a capacitor C to charge the capacitor C. At a time $t_1$ representing the commencement of the pulse, the controller closes another electronic switch S2 to complete a resonant tank circuit formed of the capacitor C and the transmit coil 22. The switch S2 remains closed over one full cycle of oscillation, at the end of which, at time $t_2$, the current through the transmit coil is zero and the voltage across the coil is maximum. At the time $t_2$, the capacitor is nearly recharged by back emf from the transmit coil, and the controller 37 opens the switch S2. It is an outstanding advantage of the metal detector 10, as compared to the pulse induction or time domain detectors generally, that there is not generally a need for the damping resistor across the transmit coil that was used to critically damp prior art current flow in the search head.

Figure 6:
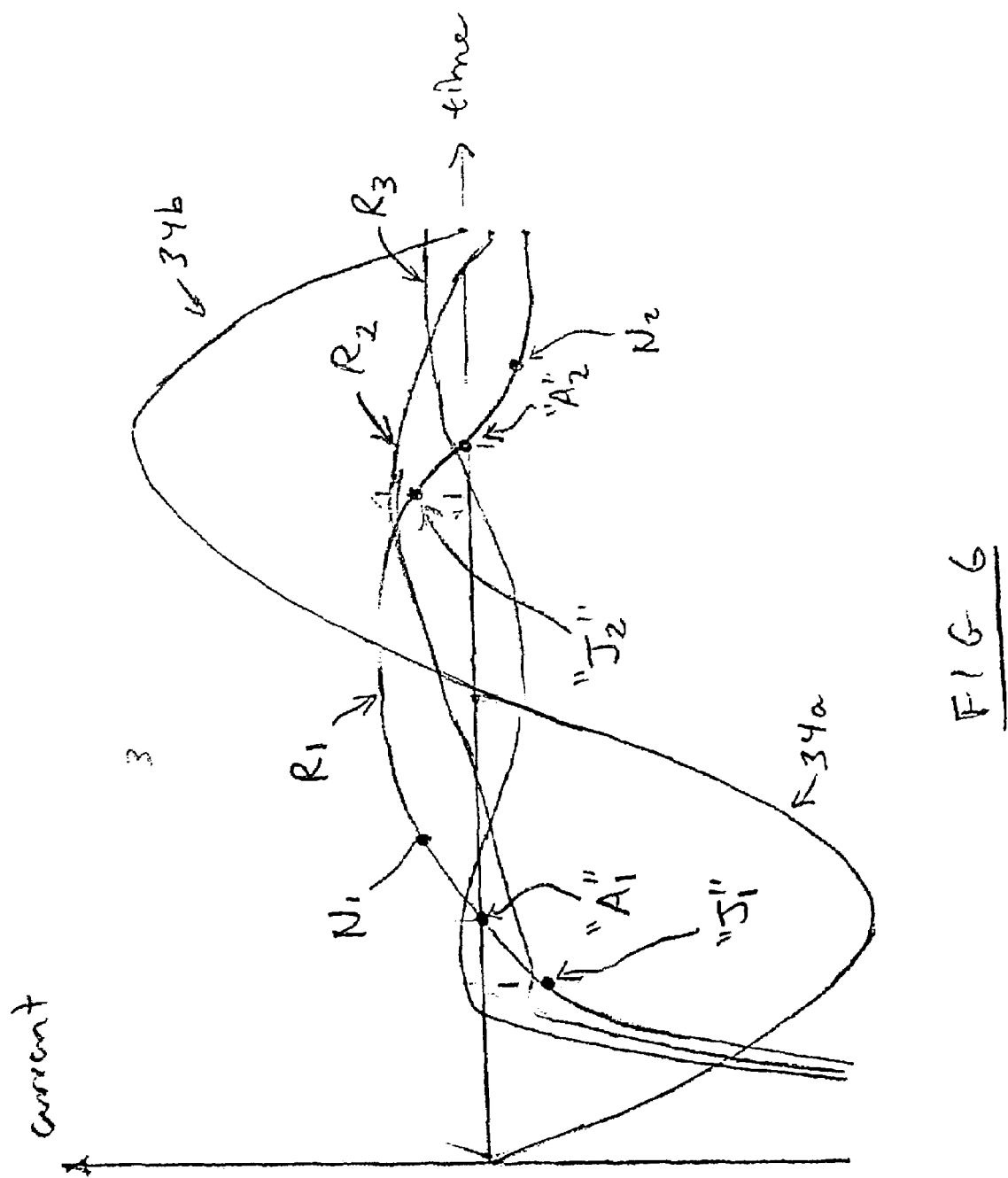
FIG. 6 is a plot of the current versus time for two current pulses that form a portion of a waveform according to the present invention, and the response of various target materials to the pulses used as an interrogating signal in the metal detector of FIG. 1.

Turning to FIG. 6, two pulses 34 (i.e., 34a, 34b) forming a full single period of a sine wave are shown. In this example, the two pulses 34 form a 200 microsecond interrogating period 32 (as defined in FIG. 2) for a single waveform 28, and were preceded by a settling period 30 (not shown). Also shown are the responses of various target materials to the pulses 34 during the time of excitation, wherein the length of the settling period 30 was chosen so that all previous responses of the target materials to previous excitations had decayed to zero. Specifically, FIG. 6 plots a response $R_1$ for ground mineralization (ferrite), $R_2$ for a steel bottlecap, and $R_3$ for a large block of aluminum, or a large coin such as a quarter.

The curve $R_1$ for ferrite crosses the time axis at points "$A_1$" and "$A_2$", i.e., the amplitude $R_1$ is zero, at approximately 90 degrees with respect to each of the pulses 34a and 34b, i.e., when the magnitude of the current is maximum and its slope is zero. The points "A" are "natural ground balanced" points, because the ferrite contribution to the detector's response at these points is zero, because the current is momentarily unchanging with time. The natural ground balanced points "A" are not precisely located, as they vary somewhat depending on the viscous magnetic remanence of the soil; moreover, where the soil includes conductive materials aside from ferrite, these will also cause the location of the points "A" to move slightly in time. This problem has been solved before in the metal detector art by providing a "ground balance" control on the instrument for the user to adjust the location of the points "A" in time, and more recently by the provision of specialized circuitry in the detector providing automatic adjustment of the ground balance points. Any such means may be used in connection with the present invention as well.

The ferrite response $R_1$ is also equal and opposite, for the excitation shown in FIG. 6, at points "J" and "N." Particularly, for the pulse 34a, the ferrite response $R_1$ is equal and opposite at points "$J_1$" and "$N_1$," and for the pulse 34b, the ferrite response $R_1$ is equal and opposite at points "$J_2$" and "$N_2$." Therefore, for each pulse, the sum of $R_1$ measured at time "J," and $R_1$ measured at time "N," is zero, producing another natural ground balanced "point" "J+N." Like the points "A," the points "J" and "N" vary somewhat in time around points that are about 60 degrees on the leading edges of the pulses 34. It may be noted that additional ground balanced points may be derived from "A" and "J+N." For example, the ratio A/(J+N), or the reciprocal, produces another point that is unchanging in the presence of ferrite ground. Any other combination or function of the points "A" and "J+N" would also be insensitive to ferrite ground.

Preferably, the response R of the metal detector to the current pulse is sampled substantially at the peak of the pulse, where the rate of change of the current is zero, to obtain a ground balanced point, and at least two samples are taken respectively on either side of the peak, where the slope of the pulse, i.e., di/dt, is of opposite sign for the two samples. As mentioned above, preferably, the current in a pulse according to the invention changes so that the time-varying rate, i.e., di/dt, is either always positive or always negative prior to reaching a peak value (which can be positive or negative) at which the rate of change of the current is zero, and thereafter changes so that the time-varying rate is either always negative or always positive, respectively. It is also desired that a range of di/dt is available before and after the peak current is reached. While a half-sine current pulse commencing and terminating at nodal points of phase is one example of such a pulse, a half-circular or a trapezoidal current pulse shape provide other examples. However, a square pulse is not ideal because, essentially, the entire duration of the pulse is at the peak value, and it is impractical to sample during the very small durations of the rising and falling edges of the pulse that remain to obtain the remaining samples.

With one ground balanced point obtained at substantially the peak of the current pulse, and a second ground balanced point obtained from the sampled values on either side of the peak, the effect of the ground can be removed or nulled in both of the aforementioned channels of the response R.

Figure 7:
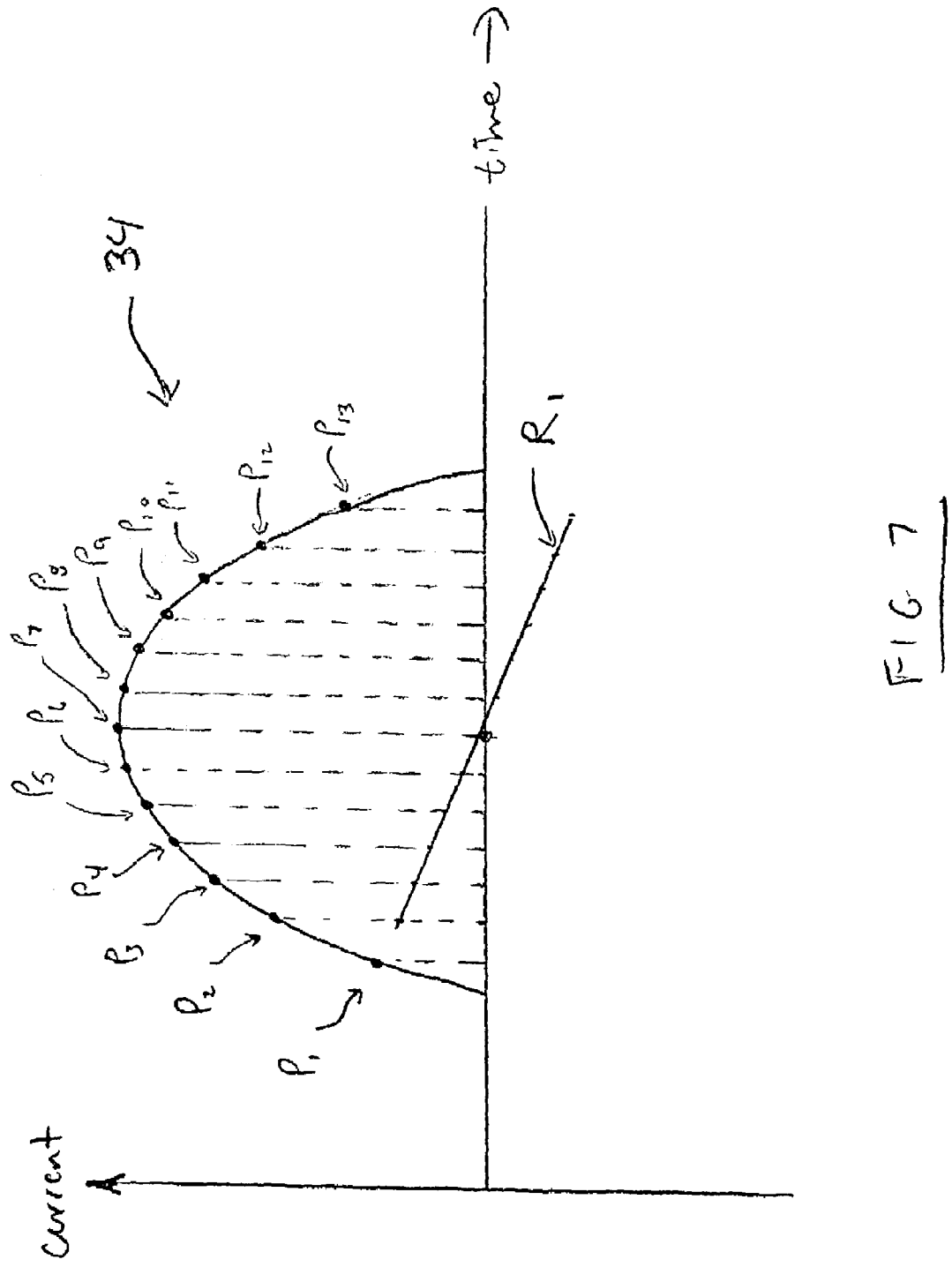
FIG. 7 is a plot of the current versus time for a single half-sine current pulse excitation and a response for ferritic ground showing sample points.

According to the principles above, a target volume of ground that lacks metal objects is used to calibrate the detector 10. The target is interrogated to produce a response "R" in the search coil indicative of ferrite in the ground. Points "A" and "J+N" as described above may be identified as natural ground balanced points. In addition or in the alternative, other ground balanced points may be derived from the response "R." Referring to FIG. 7, samples $P_n$ $(n=13)$ are taken periodically during the time of excitation of a target volume of ferritic ground by a single half-sine pulse 34. The samples could be taken at any alternative times. The samples P of the response $R_1$ are not ground balanced. However, it is always the case that two or more sample points may be combined to produce a ground balanced (or null) result. For example, any two points $P_{n1}$ and $P_{n2}$, e.g., $P_3$ and $P_4$, or $P_3$ and $P_8$, or any other combination or group of two points, can be made to produce a null result by multiplying one of them by the negative reciprocal of the other and forming a sum.

The two points could alternatively be made to produce a null result by use of any number of alternative functions. For example, the magnitudes of the response "$R_1$" at the points "$P_n$" may be transformed in any desired manner for combining as described above, such as by taking their roots. Similarly, any number of sample points greater than two may be made to produce a null result by use of an appropriate function, the parameters of which are adjusted appropriately. A most simple example for three sample points $P_1$, $P_2$ and $P_3$ is to form the sum ($P_2+P_3$), multiply $P_1$ by the negative reciprocal of ($P_2+P_3$), and add these two results together to obtain a single ground balanced point. As may be readily apparent, more functions may be constructed the more points are being combined.

A minimum of three sample points "P" of the response "R" are required to obtain two ground balanced points. For example, the three sample points A, $P_1$, and $P_2$, yield the two ground balanced points "A" and "$P_1-P_2(P_1/P_2)$." Preferably, the three sample points are obtained either within a maximum of about 500 microseconds from the start of the interrogation period, and even more preferably within a maximum of about 100 microseconds from the start of the interrogation period, or within a single pulse, i.e., between the time that the pulse first commences from a quiescent value of the current during the settling period, first reaches a peak (either positive or negative), and subsequently first returns to the quiescent value of the current, to minimize the effects of averaging.

While any duration for the settling period may be provided according to the principles of the invention, preferably the minimum duration of the settling period is about 20 microseconds to ensure that viscous magnetic remanence has at least substantially decayed for small targets, although this period may more preferably be limited to a minimum of about 200 microseconds for many targets, or larger targets.

Once it is calibrated, the detector 10 may be used to interrogate another target volume of ground that may contain a metal object, wherein it is assumed that the ground in the two target volumes is for practical purposes the same. The same excitations are used that were used for calibration, and the same mathematical manipulation of the sample points is employed as well so that the effect of the ground is substantially nulled out. Thence, any residual response at the ground balanced points, either natural or artificial, is due to the metal object. With at least two ground balanced points obtained within about 100 microseconds of the beginning of the excitation, there can be sufficient information to identify the metal object, and employing additional data points may provide additional information for ensuring accurate identification.

The sampling circuit 16 typically samples the response "R" of the detector 10 within "windows" that are on the order of 10 microseconds centered respectively on the response points of interest, e.g., "A," "J," "N," and any $P_n$. With additional reference to FIG. 1, the detector also includes a processor 50, such as a DSP, that produces the ground balanced points, which may be any of "A," "J+N," $f_1$ (A), $f_2$ (J+N), $f_3$ (A, (J+N)), and $f_4$ ($P_n$), where $f_1$, $f_2$, and $f_3$ can be any functions, and where $f_4$ is a function meeting the nulling conditions specified above. These ground balanced points are indicative of the metal object, and the processor 50 may compare them to pre-existing data in a look-up table 52 to identify the metal object. The detector 10 further typically includes a display device 54, such as an LCD, for reporting this identification to the user.

A sequence of the waveforms 28 of alternating polarity may be used to average out the effect of the earth's magnetic field. Referring to FIG. 8, one or more pairs of waveforms 28 are provided so that one waveform 28a of a pair has a first sequence of pulses 34 defining a first set of polarities (or "polarity set"), and another waveform 28b of the pair has a second sequence of pulses defining a set of polarities opposite those of the first polarity set. For example, pulses 34a and 34b of the waveform 28a define a set "SET1" of polarities that is first positive and then negative (i.e., +, −). That is, the pulse 34a represents a variation in the amplitude of the waveform 28a that is above the level of the settling period 30a, and the pulse 34b represents a variation in the amplitude of the waveform 28a that is below the level of the settling period 30a. For the adjacent waveform 28b, pulses 34c and 34d define a set "SET2" of polarities that is first negative and then positive (i.e., −, +) and is therefore opposite the set SET1. There may be additional pairs of waveforms, as shown, and the pulses 34 of any one waveform 28 may be arranged in any type, order or combination, provided that the same type, order and combination of pulses is provided in opposite polarity in the other waveform of the pair.

In the examples of specific waveforms 28 provided so far, the amplitude and period of the half-sine pulses has been the same for all the pulses, and the settling period for all waveforms 28 has also been shown to be a constant amount. However, as suggested by FIG. 2, none of these conditions is necessary to practice the invention. Further, it is believed to be advantageous to vary at least the period of the half-sine pulses and the settling periods of the waveforms.

Turning to FIG. 9, a sequence of four waveforms 28a, 28b, 28c and 28d is shown. The waveforms 28a and 28b form one pair and the waveforms 28c and 28d form another, alternating pair according to the methodology just discussed above.

The waveform 28a has a settling period 30a preceding an interrogating period 32a consisting of a single half-sine pulse 34a having a period "$T_a/2$." The sinusoidal period $T_a$ is about 67 microseconds, corresponding to a sinusoidal frequency of about 15 kHz. The subsequent waveform 28b has a settling period 30b that has a duration of about $5T_a/2$, and an interrogating period 32b consisting of two consecutive half-sine pulses $34b_1$ and $34b_2$. The pulse $34b_1$ has a polarity opposite to that of the pulse 34a and has a period "$T_{b1}/2$" which corresponds to a sinusoidal frequency of about 5 kHz. The adjacent pulse $34b_2$ has the same polarity and period as the pulse 34a. The settling period 30a is about $8T_a/2$.

The sampling circuit 16 in this embodiment samples the response R of the metal detector 10 at the peaks in magnitude of the pulses, such as at "$A_{34c}$," "$A_{34d1}$," and "$A_{34d2}$" of the respective pulses 34c of the waveform 28c and the pulses $34d_1$ and $34d_2$ of the waveform 28d. As with the points "A" discussed above in connection with FIG. 6, the points "$A_{34c}$," "$A_{34d1}$," and "$A_{34d2}$," the corresponding point "$A_{34a}$," of the waveform 28a, and the corresponding points "$A_{34b1}$" and "$A_{34b2}$" of the waveform 28b are natural ground balanced points; accordingly, the effect of ground mineralization on these samples is substantially zero.

Figure 10:
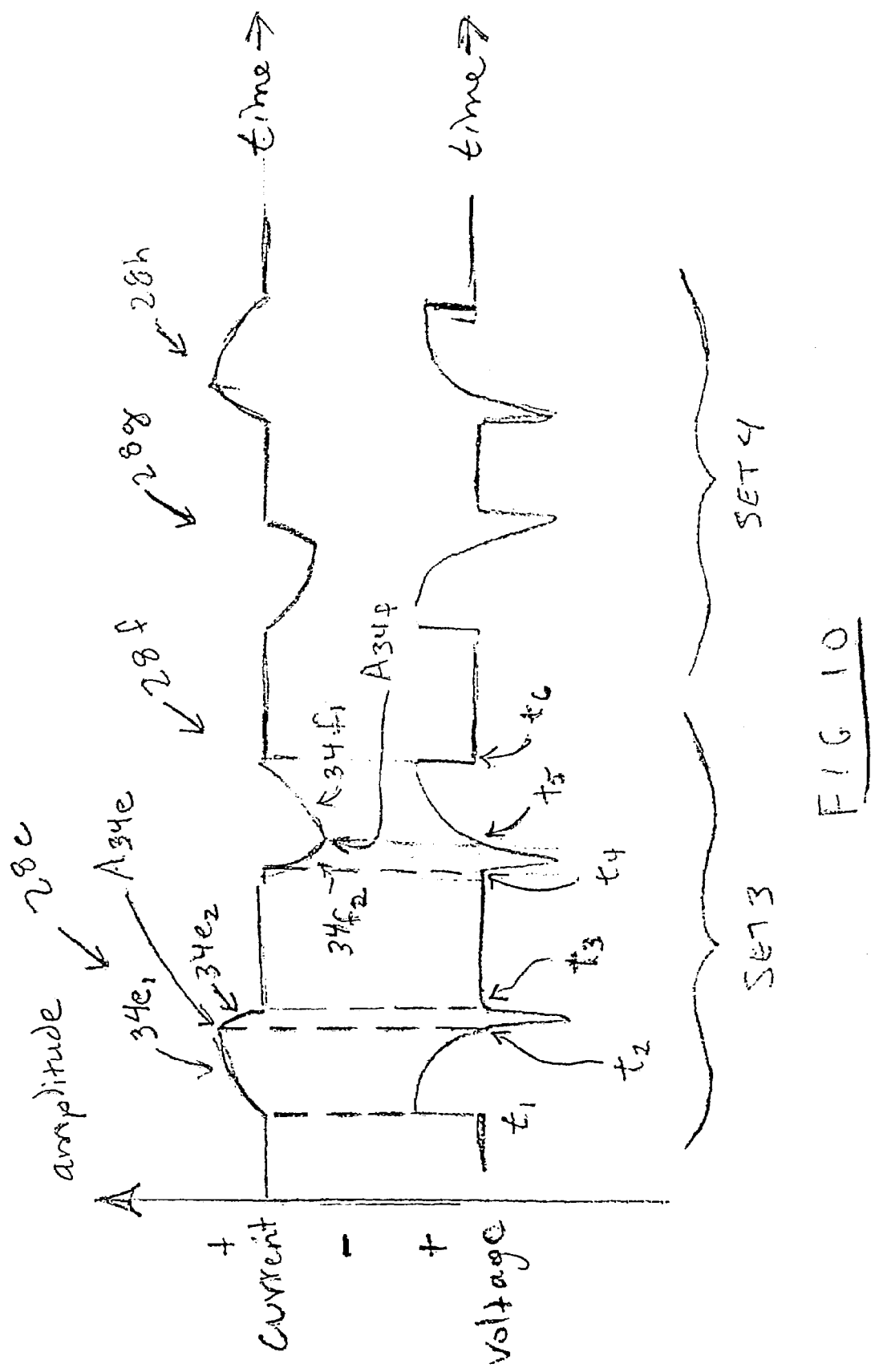
FIG. 10 is a plot of the amplitude versus time for another sequence of four waveforms according to the present invention.

Forming a ratio of the response "R" of the metal detector 10 at points "$A_{34a}$" and "$A_{34b1}$," or equivalently "$A_{34c}$" and "$A_{34d1}$," and comparing the result with the look-up table 52 permits characterizing metal in the target where the metal's response to interrogation is frequency dependent, because the half-sine pulses 34a and 34c have different periods or sinusoidal frequencies than the half-sine pulses $34b_1$ and $34d_1$. The points "$A_{34b2}$" and "$A_{34d2}$," corresponding to the relatively high frequency half-sine pulses $34b_2$ and $34d_2$, are useful to discern whether the metal in the target, or part of the metal, is iron. The response "R" at these points is affected by the immediately preceding relatively low frequency half-sine pulses $34b_1$ and $34d_1$ because there is no settling time therebetween, so the response of metal objects has not had time to decay away. This provides a different response than if a settling time had been provided. Similarly, a settling time could be used between the pulses $34b_1$ and $34b_2$, or $34d_1$ and $34d_2$, that is less than a sufficient amount for the metal object's response to the pulses to be independent of the effect of the preceding pulse to provide a different response and, therefore, more information about metal object Turning to FIG. 10, another sequence of four waveforms is shown, providing an example of asymmetric or "multi-frequency" current pulses. Pulse $34e_1$ has a duration $t_1$ to $t_2$, $34e_2$ has a duration from $t_2$ to $t_3$, $34f_1$ (which is equal and opposite to $34e_1$) has a duration $t_5$ to $t_6$, and $34f_2$ (which is equal and opposite to $34e_2$), has a duration $t_4$ to $t_5$. These four pulses (corresponding to waveforms $28e$ and $28f$) form a set of pulses SET3, where a corresponding set of pulses SET4 (corresponding to waveforms $28g$ and $28h$) may also be provided that is equal and opposite to SET3, so that similar sampling for each set provides for canceling the effect of the earth's magnetic field.

Sampling of the response "R" of the metal detector to the pulses of SET3 may be done, e.g., as follows: data may be acquired during the time $t_1$ to $t_2$, corresponding to the response "R" to the relatively low frequency pulse $34e_1$. Data may also be acquired during the time $t_2$ to $t_3$, corresponding to the response "R" to the relatively high frequency pulse $34e_2$. Since the pulse $34e_2$ follows immediately the pulse $34e_1$, the response "R" during the period $t_2$ to $t_3$ will be affected by the pulse $34e_1$, and this may provide additional information about metal objects in the target, and/or about the ground, than could have been obtained by the use of either pulse by itself.

One natural ground balanced point occurs at "$A_{34e}$," which may be utilized as described above. The ground balanced point "$A_{34e}$" corresponds to the relatively "low frequency" pulse $34e_1$. A similar ground balanced point "$A_{34f}$" corresponds to the relatively "high frequency" pulse $34f_2$.

While the foregoing discussion has related to sampling the response to an excitation during the excitation, it was also noted that sampling has typically been done in the prior art pulse induction detectors after excitation. While this strategy has the serious problem of sensitivity mentioned previously, using the strategy in conjunction with the present invention solves that problem. Accordingly, in addition to sampling during excitation, the present invention contemplates sampling after excitation as well, to any desired degree, to obtain still more information about metal objects in the target volume of ground, or about the ground itself, that may be helpful to identify the metal objects. For example, for the waveform of FIG. 10, sampling of the response "R" of the metal detector 10 may also be done during the time $t_3$ to $t_4$, during the settling period preceding the pulses $34f_2$ and $34f_1$.

It is to be recognized that, while a particular pulse induction metal detector having high energy efficiency and sensitivity has been shown and described as preferred, other configurations and methods could be utilized, in addition to those already mentioned, without departing from the principles of the invention. For example, half-sine current pulses have been described herein as being preferred forms of the excitation during the interrogation period of the waveform 28 for a number of reasons, including that they provide for a natural LC resonance in the search coil which is energy efficient, because they are rich in harmonics, and because they provide a wide range of rate of change of current. However, it is important to appreciate that any time-varying excitation may be used in accordance with the principles of the present invention, including what is known in the art as a continuous waveform, and frequency domain analysis techniques may be used in addition to time domain techniques or in the alternative.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for characterizing a first target volume of ground, comprising:
   coupling to the first target volume of ground an isolated a first half-sine wave pulse of current followed by a dormant period through a magnetic field-inducing inductive coil;
   detecting a first magnetic field response of said target volume of ground to said half sine wave pulse; and
   sampling said first magnetic field response at least once during said half-sine wave pulse, for characterizing the first target volume of ground.

2. The method of claim 1, further comprising sampling said first magnetic field response during a quiescent period subsequent to said first pulse.

3. The method of claim 2, wherein the current during said quiescent period is substantially zero.

4. The method of claim 1, further comprising providing said current from a portable battery.

5. The method of claim 1, wherein said sampling includes sampling the response during said first half-sine wave pulse (a) during a rising portion, (b) at a peak, and (c) during a falling portion of said first pulse.

6. The method of claim 5, further comprising discerning a first ground balanced point from said sampling (b), and computing a second ground balanced point from said sampling (a) and said sampling (c).

7. The method of claim 1, wherein said first target volume of ground is substantially free of metal objects, wherein said sampling includes sampling said response at first and second distinct times on respective sides of the peak of said first half-sine wave pulse to produce respective first and second calibration data points, the method further comprising determining a transformation function for transforming said first and second calibration data points so as to produce a null result.

8. The method of claim 7, further provided for characterizing one or more unknown metal objects in a second target volume of ground, the method further comprising:
   coupling to the second target volume of ground a second half-sine wave pulse;
   detecting a second response of said second target volume of ground to said second half-sine wave pulse;
   sampling said second response at said first and second times to produce respective first a second target data points corresponding to said first and second calibration data points;
   sampling said second response at the peak of said second instance of said half-sine wave pulse to produce a first ground balanced target data point;
   applying said transformation function to said first and second target data points so as to produce a second ground balanced target data point; and
   characterizing the one or more unknown metal objects using said first and second ground balanced target data points.

9. The method of claim 8, wherein said sampling includes sampling said second response at least once during said second half-sine wave pulse.

10. The method of claim 9, further comprising sampling said second response during the quiescent period subsequent to said second pulse.

11. The method of claim 10, wherein the current during said quiescent periods is substantially zero.

12. The method of claim 10, further comprising identifying the one or more unknown metal objects by comparing said first and second ground balanced target data points with pre-existing data.

13. The method of claim 12, wherein said step of determining said transformation function comprises determining parameters thereof, and wherein said step of applying said transformation function includes employing said parameters.

14. The method of claim 8, further comprising providing said current from a portable battery.

15. An apparatus for characterizing a first target volume of ground, comprising:
- a current source for producing an isolated first half-sine wave pulse of current followed by a dormant period;
- a magnetic field-inducing inductive coil for carrying said first half-sine wave pulse and coupling said first half-sine wave pulse to the first target volume of ground;
- a detecting circuit for detecting a first magnetic field response of said target volume of ground to said first half-sine wave pulse; and
- a sampling circuit for sampling said first magnetic field response at least once during said first half-sine wave pulse, for characterizing the first target volume of ground.

16. The apparatus of claim 15, wherein said sampling circuit is further adapted for sampling said first response during a quiescent period subsequent to said first half-sine wave pulse.

17. The apparatus of claim 16, wherein said source is adapted to provide that the current during said quiescent period is substantially zero.

18. The apparatus of claim 17, further comprising a portable battery for powering said source.

19. The apparatus of claim 15, wherein said sampling circuit is adapted for sampling the response during said first half-sine wave pulse (a) during a rising portion, (b) at a peak, and (c) during a falling portion thereof.

20. The apparatus of claim 19, further comprising a processing circuit for discerning a first ground balanced point corresponding to said sampling (b), and computing a second ground balanced point corresponding to said sampling (a) and said sampling (c).

21. The apparatus of claim 15, wherein said sampling circuit is adapted for sampling said response at first and second distinct times on respective sides of the peak of said first half-sine wave pulse to produce respective first and second data points, further comprising a processing circuit for determining a transformation function for transforming said first and second data points so as to produce a null result.

22. The apparatus of claim 21, further provided for characterizing one or more unknown metal objects in a second target volume of ground, said coil for carrying a second half-sine wave pulse and coupling said second half-sine wave pulse to the second target volume of ground, said detecting circuit for detecting a second response of the second target volume of ground to said second half-sine wave pulse, said sampling circuit for sampling said second response at said first and second times to produce respective third and fourth data points corresponding to said first and second data points and sampling said second response at the peak of said second half-sine wave pulse to produce a first ground balanced data point, wherein said processing circuit is adapted for applying said transformation function to said third and fourth data points so as to produce a second ground balanced data point, and characterizing the one or more unknown metal objects using said first and second ground balanced data points.

23. The apparatus of claim 22, wherein said sampling circuit is adapted for sampling said second response at least once during said second half-sine wave pulse.

24. The apparatus of claim 23, wherein said sampling circuit is adapted for sampling said second response during the quiescent period subsequent to said second half-sine wave pulse.

25. The apparatus of claim 24, wherein said processing circuit is adapted for identifying the one or more unknown metal objects by comparing said first and second ground balanced target data points with pre-existing data.

26. The method of claim 25, wherein said processing circuit is adapted for determining parameters of said transformation function and applying said transformation function by employing said parameters.

27. The apparatus of claim 24, wherein said source is adapted to provide that the current during said quiescent period is substantially zero.

28. The apparatus of claim 23, further comprising a portable battery for powering said source.

29. The method of claim 28, wherein said sampling includes sampling said second response at least once during said second half-sine wave pulse.

30. The method of claim 29, further comprising sampling said second response during the quiescent period subsequent to said half-sine wave pulse.

31. The method of claim 30, further comprising identifying the one or more unknown metal objects by comparing said first and second ground balanced target data points with pre-existing data.

32. The method of claim 31, wherein said step of determining said transformation function comprises determining parameters thereof, and wherein said step of applying said transformation function includes employing said parameters.

33. The apparatus of claim 22, wherein said sampling circuit is adapted for sampling said second response at least once during said second half-sine wave pulse.

34. The apparatus of claim 33, wherein said sampling circuit is adapted for sampling said second response during the quiescent period subsequent to said second half-sine wave pulse.

35. The apparatus of claim 34, wherein said processing circuit is adapted for identifying the one or more unknown metal objects by comparing said first and second ground balanced target data points with pre-existing data.

36. The method of claim 35, wherein said processing circuit is adapted for determining parameters of said transformation function and applying said transformation function by employing said parameters.

* * * * *